US008693351B2

(12) United States Patent
Olgaard

(10) Patent No.: US 8,693,351 B2
(45) Date of Patent: Apr. 8, 2014

(54) SYSTEM AND METHOD FOR DETERMINISTIC TESTING OF PACKET ERROR RATE IN ELECTRONIC DEVICES

(75) Inventor: Christian Volf Olgaard, Saratoga, CA (US)

(73) Assignee: Litepoint Corporation, Sunnyvale, CA (US)

( * ) Notice: Subject to any disclaimer, the term of this patent is extended or adjusted under 35 U.S.C. 154(b) by 155 days.

(21) Appl. No.: 13/191,154

(22) Filed: Jul. 26, 2011

(65) Prior Publication Data
US 2013/0028100 A1  Jan. 31, 2013

(51) Int. Cl.
*H04L 12/26* (2006.01)
(52) U.S. Cl.
USPC ........................................... 370/242; 370/241
(58) Field of Classification Search
USPC .................................................. 370/242, 241
See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz et al. | |
| 5,138,608 A | 8/1992 | Kucera et al. | |
| 5,910,977 A | 6/1999 | Torregrossa | |
| 6,753,693 B2 | 6/2004 | Seo et al. | |
| 6,870,392 B2 | 3/2005 | Kilian et al. | |
| 6,986,086 B2 | 1/2006 | Scholten | |
| 7,057,518 B2 | 6/2006 | Schmidt | |
| 7,154,944 B2 * | 12/2006 | Jungerman | 375/224 |
| 7,463,140 B2 | 12/2008 | Schmidt | |
| 7,564,893 B2 | 7/2009 | O'Neill | |
| 7,865,147 B2 * | 1/2011 | Olgaard et al. | 455/67.14 |
| 7,873,339 B2 * | 1/2011 | Qi et al. | 455/226.2 |
| 7,890,822 B2 | 2/2011 | Behziz et al. | |
| 2008/0287117 A1 | 11/2008 | Olgaard et al. | |
| 2009/0147678 A1 * | 6/2009 | Xhafa et al. | 370/232 |
| 2010/0007355 A1 * | 1/2010 | Olgaard et al. | 324/601 |
| 2011/0103235 A1 * | 5/2011 | Luong et al. | 370/245 |
| 2011/0292809 A1 * | 12/2011 | Olgaard et al. | 370/241 |
| 2012/0051224 A1 * | 3/2012 | Olgaard et al. | 370/241 |

OTHER PUBLICATIONS

International Search Report for PCT/US2012/039927 dated Dec. 3, 2012; 5 pages.

* cited by examiner

*Primary Examiner* — Hassan Kizou
*Assistant Examiner* — Abdullahi Ahmed

(57) ABSTRACT

A method and system for testing packet error rate in electronic devices by transmitting a series of data packets from a testing device to a device under test (DUT) and setting a predefined number of received error-free data packets; evaluating whether a number of data packets from the series of data packets received error-free by the DUT equals the predefined number of received error-free data packets and transmitting additional data packets from the testing device to the DUT, at a power level known to produce zero received-packet errors in a correctly operating DUT, if the number of data packets from the series of data packets received error-free by the DUT does not equal the predefined number of received error-free data packets. Additional possible embodiments include evaluating whether a total number of data packets from the series of data packets and the additional error-free-power-level data packets received error-free by the DUT equals the predefined number of received error-free data packets and transmitting a confirmation data packet to the testing device in response to reception by the DUT of the predefined number of received error-free data packets.

24 Claims, 4 Drawing Sheets

PRIOR ART

SYSTEM AND METHOD FOR DETERMINISTIC TESTING OF PACKET ERROR RATE IN ELECTRONIC DEVICES

TECHNICAL FIELD

The present invention relates generally to systems and methods for testing electronic equipment. More particularly, it relates to improvements in systems and methods for testing wireless devices using test platforms consisting of hardware, firmware and/or software components requiring minimal feedback from the devices.

BACKGROUND

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data. In general, all of these wireless-connectivity capabilities (e.g. WiFi, WiMAX, Bluetooth, etc.) are defined by industry-approved standards (e.g. IEEE 802.11 and IEEE 802.16) which specify the parameters and limits to which devices having those connectivity capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals, and to send signals that subscribe to industry-approved standards so as to determine whether a device is receiving and processing the wireless signals in accordance with its standard.

A common test in wireless devices is determining the data packet error rate (PER) at various power levels to ensure that a device meets or exceeds the PER specifications over the specified range of power levels. The test requires a means for sending data packets to the device under test (DUT), detecting when a data packet has been received with no errors, and keeping track of the proportion of error-free data packets to total number of data packets sent. Some wireless protocols provide a reasonably efficient acknowledgement process that can be used to count and keep track of error-free data packets received. Other protocols, like Bluetooth LE, would require additional time slots for sending such acknowledgement (ACK) confirmations, i.e., data packets, which would essentially result, in some cases, in doubling the testing time. A common challenge presented by conventional testing strategies employs sequences which fail to contribute direct test value.

Accordingly, a need exists for an improved adaptive functionality to eliminate the reliance on data packet-by-data packet ACK accounting for calculating PER. A further need exists to reduce the time and cost of performing PER analysis and testing in any case that involves sending and receiving a predetermined number of error-free data packets.

SUMMARY

It is, therefore, an object of the present invention to overcome the deficiencies of the prior art to include a system and deterministic method for arriving at accurate PER measurements involving very limited feedback from the device under test. As such, the disclosed invention reduces the instances of acknowledgement feedback intervals which, in turn, reduces the overall time and cost of this aspect of wireless device testing where one relies on a DUT receiving a predetermined number of error-free data packets before it reacts and confirms receipt to a test system.

In accordance with one disclosed exemplary embodiment, a method of testing a communication device is provided that in some embodiments comprises transmitting a series of data packets from a testing device to a device under test (DUT) and setting a predefined number of received error-free data packets. The method may also include evaluating whether a number of data packets from the series of data packets received error-free by the DUT equals the predefined number of received error-free data packets and transmitting additional data packets from the testing device to the DUT at a power level known to produce error-free received packets if the number of data packets from the initial series of data packets received error-free by the DUT does not equal the predefined number of received error-free data packets. Additional embodiments of the method may also include evaluating whether a total number of data packets from the initial series of data packets and the additional number of zero-error power level data packets received error-free by the DUT equals the predefined number of received error-free data packets and transmitting a confirmation data packet to the testing device in response to reception by the DUT of the predefined number of received error-free data packets.

In accordance with another disclosed exemplary embodiment, a method of testing a communication device is provided that in some embodiments comprises transmitting a one or more data packets from a testing device to a device under test (DUT) in a test-ready sequence, determining whether the DUT is ready to receive test packets by having transmitted a confirmation data packet to the testing device in response thereto. The method may also include transmitting a series of data packets from the testing device to the (DUT), setting a predefined number of received error-free data packets and evaluating whether a number of data packets from the second series of data packets received error-free by the DUT equals the predefined number of received error-free data packets. Additional embodiments of the method may also provide for transmitting additional data packets from the testing device to the DUT at a power level known to produce error-free received packets if the number of data packets from the initial series of data packets received error-free by the DUT does not equal the predefined number of received error-free data packets. Further possible steps include evaluating whether a total number of data packets from the initial series of data packets and the additional error-free power level data packets received error-free by the DUT equals the predefined number of received error-free data packets and transmitting another confirmation data packet to the testing device in response to reception by the DUT of said predefined number of received error-free data packets.

In accordance with yet another disclosed exemplary embodiment, a test system for an electronic device is provided that in some embodiments comprises a controller coupled to a testing device via a first communications channel and operatively configured to command software functions of the testing device to control a device under test (DUT). The system may also include the testing device coupled to the DUT via a second communications channel and operatively configured to send, receive, and analyze electronic signals. The DUT may be operatively configured to include a means of setting a predetermined number of error-free data packets representing a deterministic number of received error-free data packets.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF EMBODIMENTS

Figure 1:
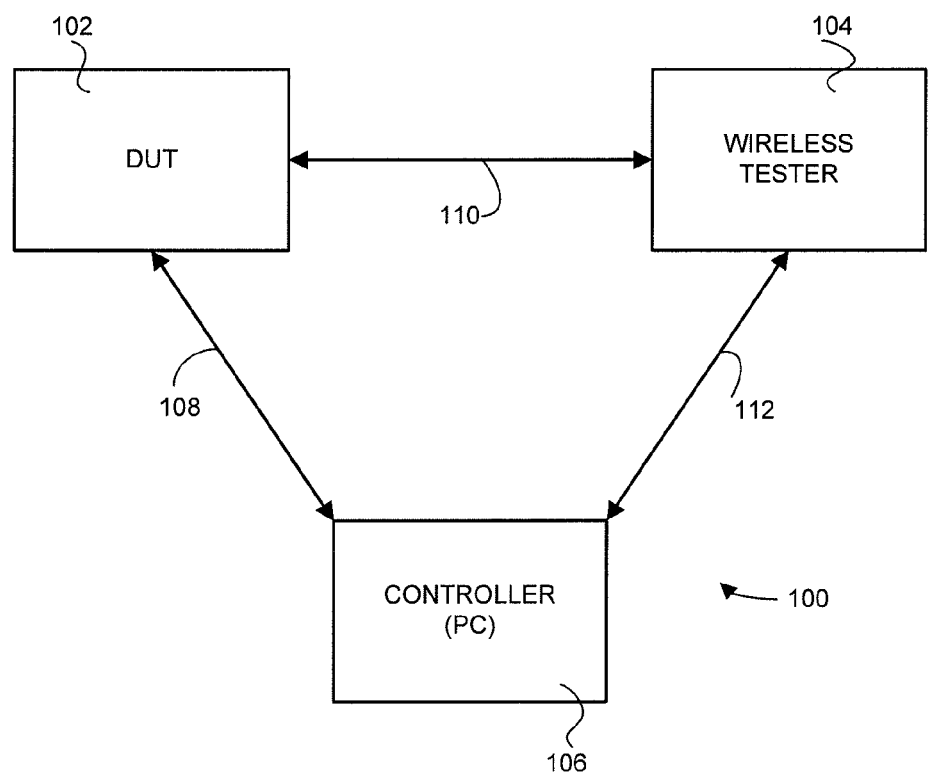
FIG. 1 is a prior-art diagram depicting a conventional wireless test system

The invention will now be described with reference to the drawing figures, in which like reference numerals refer to like parts throughout. The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawing, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implements using one or more appropriately programmed processors, depending upon the signal frequencies or data rates to be processed.

Referring to FIG. 1, a conventional wireless test system 100 is employed to support a device under test (DUT) 102, test equipment 104 configurable to send and receive signals like those specified by the underlying standard, and a PC-based controller 106 for control of the testing. The DUT 102, test equipment 104 and controller 106 may be configured to communicate with one another using one or more communications channels. By way of example communications channels 108, 110 and 112 are provided between the controller 106 and DUT 102, the DUT 102 and the test equipment 104, and the test equipment 104 and controller 105, respectively, as depicted in the exemplary wireless test system 100. These channels (108, 110, and 112) may be conductive (i.e., using wires) or wireless (i.e., using IR, RF or any other form of wireless signal exchange).

The test equipment 104 may comprise a wireless tester including, for example, other electronic components such as a vector signal generator (VSG) and a vector signal analyzer (VSA). The DUT 102 may comprise one or more electronic components and configurations such as a number of embedded sub systems, including a host processor, memory (e.g., non-volatile memory), a wireless transceiver and one or more peripheral devices. The host processor may be configured to control the memory, wireless transceiver and peripheral devices via various control interfaces. Typically, the memory stores, as firmware, programs to be used by the DUT 102. The controller 106 may generally be configured to run the production test software that controls the DUT 102 through communications channel 108, e.g., universal serial bus (USB), serial peripheral interface (SPI), RS-232 serial interface, etc. The controller 106 may also control the test equipment 104 via communications channel 112, e.g., USB, general purpose interface bus (GPIB), Ethernet, etc. The test equipment 104 is configured to communicate with the DUT 102 (such to an internal wireless transceiver) via communications channel 110, which can be a wired or wireless interface. The test equipment 104 will need to provide signal transmission, signal reception and signal analysis functions. It will be readily appreciated that, depending upon how these functions are implemented, such instrumentation can be implemented by one test instrument or by coupling multiple test instruments together.

Figure 2:
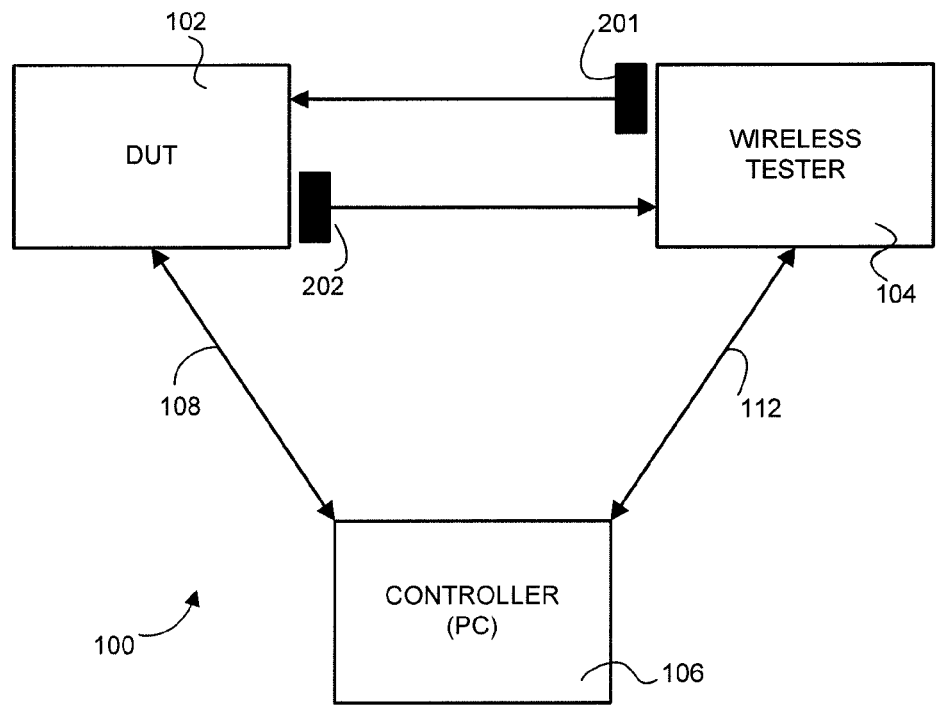
FIG. 2 is the prior-art diagram of FIG. 1 including a means for depicting an acknowledgment data packet return.
Figure 2:
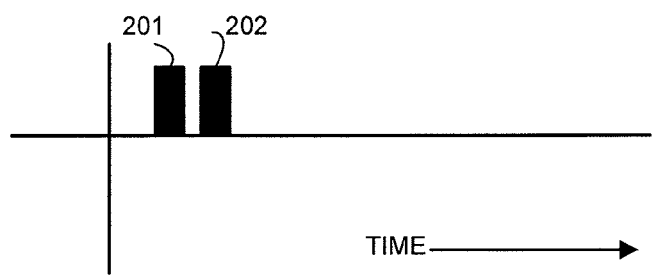

Referring to FIG. 2, the wireless test system 100, as shown in FIG. 1, can be used to send a data packet(s) 201 from the test equipment 104 to the DUT 102. The DUT 102 may receive the data packet(s) 201, decode the data and then re-encode the data to produce a return transmit signal containing corresponding data packets for analysis by the test equipment 104. Such returned data packets can be analyzed for various transmit parameters, such as power, quality (e.g., error vector magnitude (EVM)), spectral properties (e.g., associated spectral, or transmission, mask), etc. Upon receipt of an error-free data packet, the DUT 102 will return an acknowledgement (ACK) data packet 202 to the test equipment 104. By sending a plurality of data packets 201 from the test equipment 104 to the DUT 102, the DUT 102 will respond with a plurality of ACK 202 data packets following each "good" (i.e., error-free) data packet received. In an alternative method, the test equipment 104 may send a known number of data packets 201 to the DUT 102, after which the test equipment 104 queries the DUT 102 as to the number of data packets 201 received. Further details of the process are explained below. Both of these methods, well-known to those skilled in the art, can provide the test equipment 104 with a count of error-free data packets (A) that can be compared to the number of data packets (P) sent by the tester to produce a data packet-error rate (PER) measurement, for example, where:

$$PER\ percent = (1 - A/P) \times 100$$

As shown, the first method requires the DUT 102 to respond with an acknowledgement data packet 202 corresponding to each and every error-free data packet received. Thus, the overall test time is a combination of the time for sending the data packets 201 from the test equipment 104 plus the time for sending all the acknowledgement (feedback) data packets 202 from the DUT 102 to the test equipment 104.

In the second conventional method, the controller 106 can query the DUT 102 such as through a common interface to ascertain the number of error-free data packets received. For example, FIG. 2 illustrates connection 108 between the DUT 102 and the controller 106. However, in many cases such common interfaces or connections 108 are not desirable and/or may not be feasible. If the employed method counts the ACKs 202 returned upon reception of a good data packet, the aforementioned DUT/controller connection 108 is not necessarily needed. But, if the method employed utilizes the controller 106 to query the DUT 102 for the number of data packets 201 received, the aforementioned DUT/controller connection 108 may simplify the process for determining PER percent. However, the DUT 102, per se, may not know how many data packets 201 that a test instrument 104 has sent to it. Thus, in an instance where the DUT fails to recognize a forwarded data packet 201, the DUT 102 does not know that the data packet 201 was sent and would, therefore, fail to acknowledge receipt of the data packet 201.

Nonetheless, PER can be calculated by sending the DUT 102 data packets 201 until the DUT 102 receives a predefined number of error-free data packets. This method has an advantage that one can include a PER operation in a predefined test script, for example, because the DUT 102 will know when a PER operation is completed, and can continue to the next step in the predefined test sequence. This can even happen without communication to the DUT 102, in the case where one uses ACK confirmations, because the controller 106 does not need to query the DUT 102. In a system like Bluetooth Low Energy (BT LE) one could choose to have a DUT 102 produce an ACK data packet 202 (although it is not specified like this) for every error-free data packet received. However, the aforementioned operation may effectively double the test time of a perfectly functioning device, since a test data packet can only be sent during every other time slot (due to the fact that the other time slot is needed for the ACK data packet 202).

Figure 3:
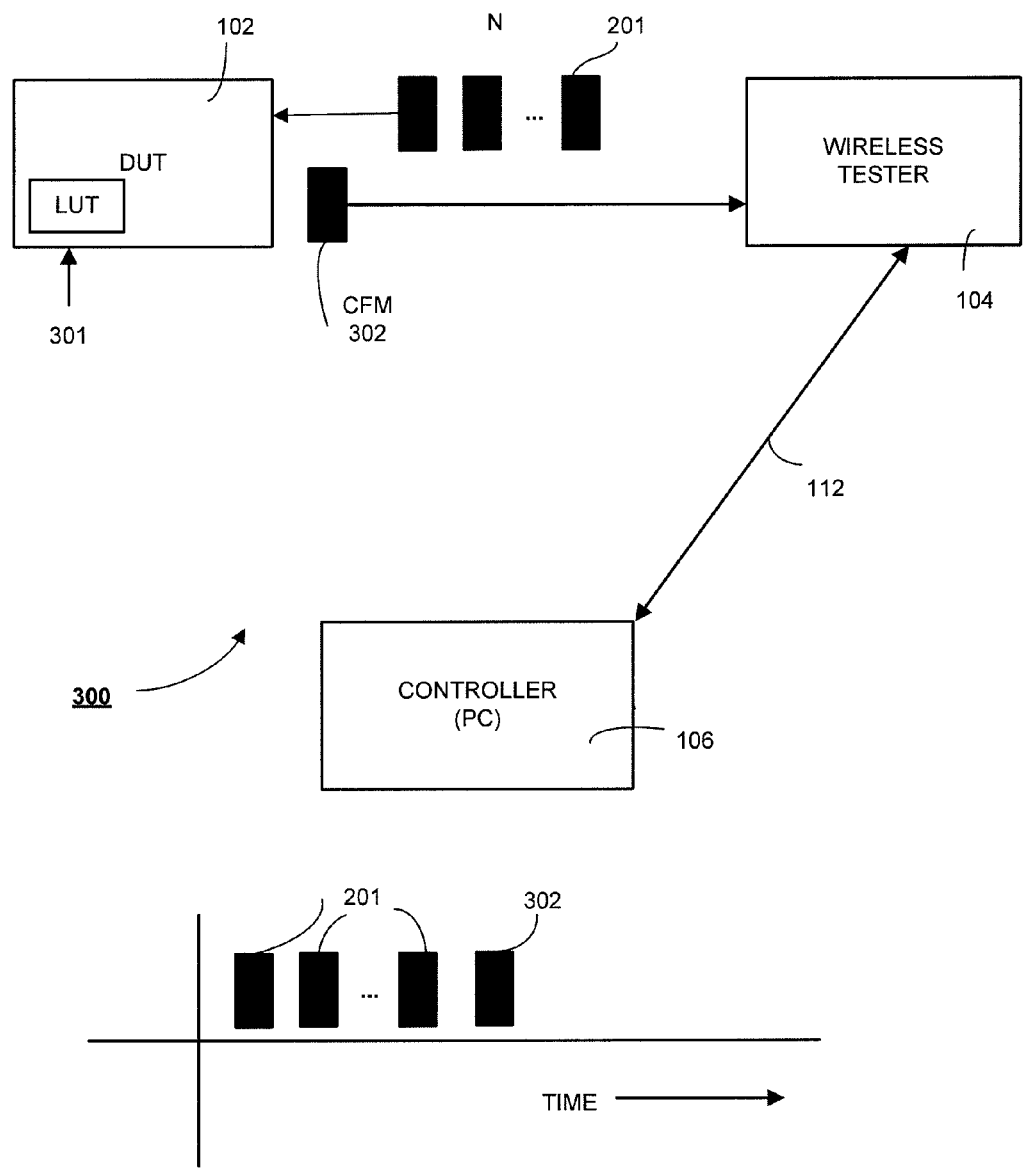
FIG. 3 illustrates a wireless test system including a look-up table (LUT) according to an exemplary disclosed embodiment.

FIG. 3 illustrates a wireless test system 300 which may utilize similar components of FIGS. 1 and 2. In this exemplary configuration, the DUT 102 may include a means of setting a predetermined number of error-free data packets that, for example, represents a deterministic number of received error-free data packets. In one embodiment, the DUT includes an internal look-up table (LUT, 301). The LUT may include a description of a set of agreed upon sequences in which the DUT 102 and test equipment 104 engage. Based upon these parameters, a deterministic number of received error-free data packets is achieved for the described wireless test system 300. While the LUT 301 is employed by the DUT 102 in the described example, it is noted that any technology means may be used where one can establish a predefined value, such as the number of error-free data packets that must be received before the DUT 102 will send a confirming data packet (CFM) 302 back to the test equipment 104.

Upon reaching the deterministic number of received error-free data packets, the DUT 102 preferably sends a confirmation data packet 302 to the test equipment 104. In a perfect case, when every data packet 201 is received error-free and when the test equipment 104 has sent a number of data packets equal to the number in the LUT 301 or its equivalent, the DUT 102 will send the CFM data packet 302 to the test equipment 104. It is noted that the aforementioned communications path 108 (e.g., see FIG. 2) between the controller 106 and the DUT 102 is no longer required in the embodiment as shown in FIG. 3. This configuration is consistent with many advanced wireless devices having no convenient way to interface them with a test controller. All communications, therefore, take place between the DUT and the tester.

Thus, in an exemplary scenario, the number of error-free data packets that must be received may be set at N data packets (e.g., see FIG. 3). When every data packet sent by the test equipment 104 is, in fact, received error-free, the tester will have sent N data packets, therefore triggering the DUT 102 to reply with a CFM (confirmation) data packet 302. Where one or more data packets 201 are received with errors, then the DUT 102 will not have a count of N, and will not send a CFM data packet 302.

One issue that may arise with the prescribed methodology is that of a malfunctioning DUT, wherein the DUT may never receive and/or recognize the predetermined number of data packets N. In this case, the test will continue unabated. Also, if a DUT is malfunctioning, but still receiving some of all N data packets once in a while, it will take a very long time to receive the predetermined number of good data packets. This time delay can waste resources and is undesirable. In order to address these concerns, the disclosed invention provides additional solutions described by the following embodiments of the present invention.

Figure 4:
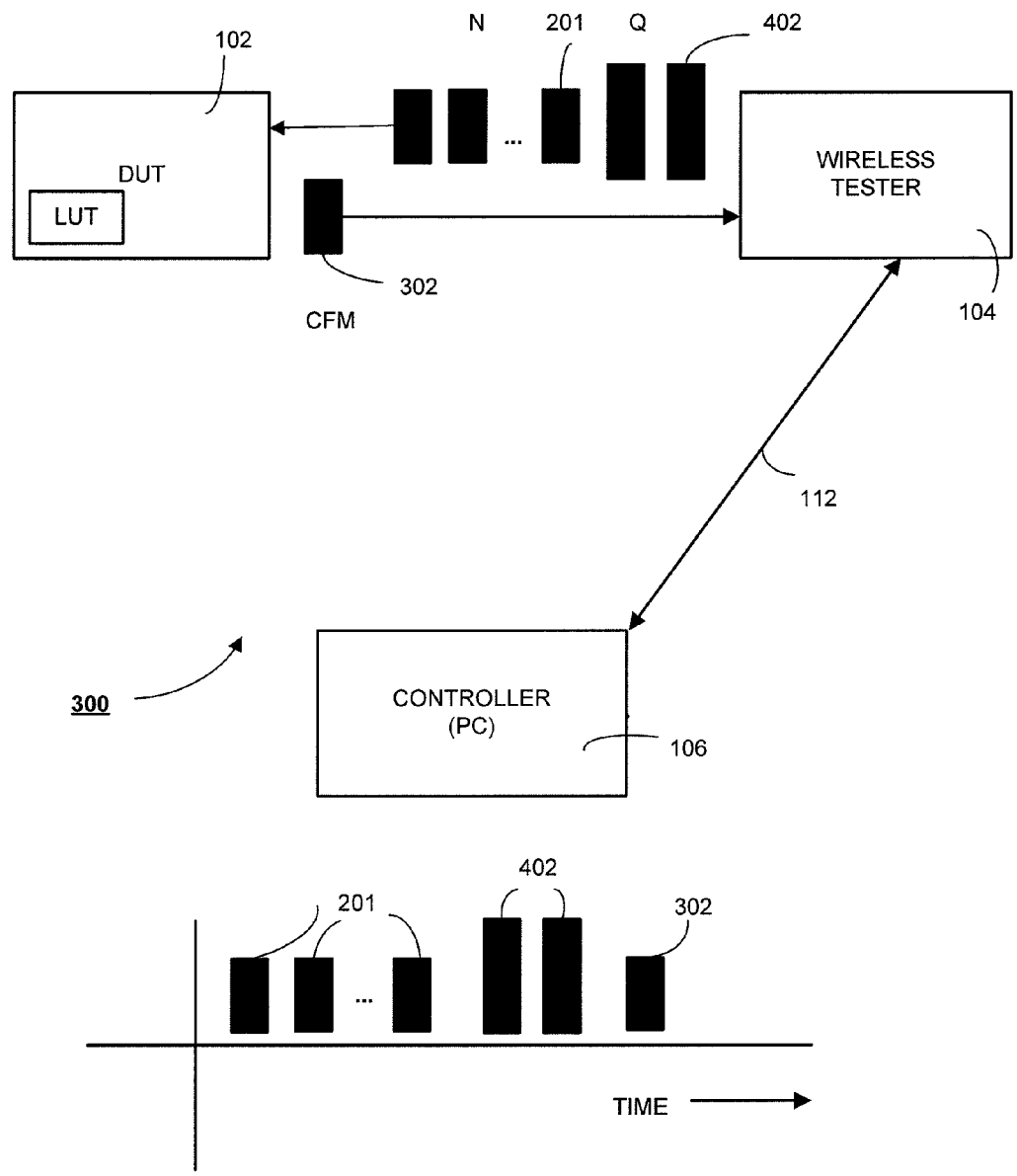
FIG. 4 illustrates the wireless test system of FIG. 3 including an improved testing and confirmation scheme according to an exemplary disclosed embodiment.

Referring to FIG. 4, the same apparatus configuration is preferably used as shown in FIG. 3. The wireless test system 300 of FIG. 4 similarly dispenses with a DUT/controller communications interface 108 (e.g., see FIG. 2). As in FIG. 3, a series of data packets 201 is transmitted to the DUT 102. However, in this case, some of the data packets 201 received by the DUT 102 have errors and will not be counted toward the predefined number of error-free data packets, N. As a result, no CFM data packet 302 is sent by the DUT 102 after the test equipment 104 sends N data packets at a prescribed fixed power level.

In a preferred embodiment of the present invention, the DUT 102 is operable to correctly decode data packets received within a prescribed range of power levels (e.g., minimum and maximum power levels as prescribed by any of a multitude of defining standards, such as Bluetooth LE). And so, upon sending N data packets at the prescribed test power level (e.g., within the range of prescribed minimum and maximum power levels), and having received no CFM data packet 302 confirmation, the test equipment 104 preferably automatically begins sending additional data packets 402 at a power level statistically known to produce zero PER in a properly operating DUT 102. Hence, the DUT 102 will be able to recognize, e.g., decode without error, the received new data packets 402 at the aforementioned power level. New data packets 402 will now contribute to the total count to obtain the predefined number of error-free packets N. Once Q number of these new data packets 402 are sent, and the number of error-free data packets received by the DUT 102 now equals N (the predefined number), the DUT 102 will send the CFM data packet 302 to the test equipment 104. The number of new-power-level data packets sent, Q, is equal to the data packets not received during the first part of the testing sequence. Thus, PER is derived as follows:

$$PER=([Q/N]\times 100)$$

If every data packet sent at the first power level (e.g., the test level) is received error free, then Q=0, and the PER=0. Where Q is not equal to zero, the PER percent is calculated by the ratio of (Q/N)×100. In the case where a DUT is non-functional, and receives no good data packets, after the tester has sent Q data packets at the new level, where Q=N, and received no CFM acknowledgement, then it is clear that PER=100 percent and the device is faulty. Thus, a worst-case scenario for a test time includes the use of a faulty DUT wherein the wireless tester sends 2N data packets, i.e., N at the test power level, and N at the new power level. Nevertheless, even if data packet errors do occur, the advantages provided by the disclosed invention will always yield a testing time, at least, equal to or faster than conventional systems. This is due to the provision for sending data packets 402 at a power level statistically known to produce zero PER in a properly operating DUT. By doing so, the described wireless test system of the present invention improves the testing capability over conventional testing systems which merely keep sending data packets until a predetermined number of data packets are received.

One note of concern with testing systems that do not provide feedback is ensuring that the receiver is ready before starting the test. If the receiver is not ready, it will likely miss data packets forwarded thereto until the receiver obtains a "ready" status. This anomaly may produce an erroneous PER result if calculated, for example, as described above. In order to address any such irregularities, disclosed aspects of the invention may provide an additional featured embodiment including, for example, a "test-ready" receive sequence where the DUT 102 first receives at least one data packet 201. In this scenario, the at least one data packet 201 may be regarded as part of a series of packets transmitted as part of the test receive sequence. In the presently described scenario, upon receipt of the data packet 201, the DUT 102 is configured to generate a CFM data packet 302 in response thereto. In another embodiment, the DUT 102 may be configured to generate another CFM data packet 302 only after receiving a predetermined number of good data packets totaling, for example, N data packets.

Thus, in a test-receive sequence, the test equipment 104 may initially start out sending data packets to the DUT 102 until a first CFM data packet 302 is received by the testing equipment 104. Upon receipt of the first CFM data packet 302, the test equipment 104 may begin an actual PER test by sending a series of test-power-level data packets to the DUT 102. This series of data packets may include sending a plurality of data packets 201 after receiving the aforementioned first CFM data packet 302 during the "test-ready" receive sequence. In that the DUT 102 has previously generated the first CFM data packet 302 during the "test-ready" receive sequence, the DUT 102 has already confirmed that the receiver is ready to receive data packets thereafter for an actual PER test sequence. In order to make the entire testing sequence faster, the data packets sent during the "test-ready" sequence may be sent at the known zero-error power level. A properly operating DUT 102 will typically respond with a ready CFM data packet 302 after one or two such packets have been sent by the tester 104. A DUT 102 which does not respond during the "test-ready" sequence, and subsequently times out, would be considered faulty.

Based upon the foregoing discussion, in accordance with another embodiment, it should be appreciated that it can be ensured that a faulty DUT will not unduly prolong test time. During the "test-ready" status step, if after a predetermined time interval where the DUT fails to return a "ready" confirmation, the test is concluded and the DUT adjudged a failed device. Alternatively, in an embodiment in which there is no "test-ready" status step, and after the tester has sent a predefined number of packets at a first power level and the DUT has received no, or at least an insufficient number of, error-free packets, the tester will then continue by sending N packets at the power level known to produce error-free received packets. If, following that, the DUT has still received no, or at least an insufficient number of, error-free received packets, then the DUT can be considered faulty and its testing concluded. Accordingly, following confirmation of test-ready status, it can be ensured that the tester will send no more than twice the number of predefined packets before testing is concluded.

Disclosed embodiments of the invention, as described herein, serve to eliminate the reliance on data packet-by-data packet ACK accounting, thereby replacing it with a deterministic method for calculating PER. This approach reduces the time and cost of PER testing in any case that involves sending and receiving a predetermined number of error-free data packets. Described embodiments include a deterministic method for arriving at accurate PER measurements involving very limited feedback from the device under test. As such, the invention, thereby, reduces the instances of acknowledgement feedback intervals. Doing so reduces the overall time and cost associated with wireless device testing including, for example, the reliance of a DUT receiving a predetermined number of error-free data packets before it reacts and confirms receipt to a test system.

It will be apparent to those skilled in the art that various modifications and variations can be made in the disclosed apparatus and method without departing from the scope of the disclosure. Additionally, other embodiments of the apparatus and method will be apparent to those skilled in the art from consideration of the specification. It is intended that the specification and examples be considered as exemplary only, with a true scope of the disclosure being indicated by the following claims and their equivalents.

The system, as described in the present technique or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present technique.

The computer system comprises a computer, an input device, a display unit and/or the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

While the following description is presented to enable a person of ordinary skill in the art to make and use the technique, and is provided in the context of the requirement for a obtaining a patent. The present description is the best presently-contemplated method for carrying out the present technique. Various modifications to the preferred embodiment will be readily apparent to those skilled in the art and the generic principles of the present technique may be applied to other embodiments, and some features of the present technique may be used without the corresponding use of other features. Accordingly, the present technique is not intended to be limited to the embodiment shown but is to be accorded the widest cope consistent with the principles and features described herein.

What is claimed is:

1. A method of testing a communication device comprising:
   transmitting a series of data packets from a testing device to a device under test (DUT);
   setting a predefined number of received error-free data packets;
   evaluating whether a number of data packets from the series of data packets received error-free by the DUT equals the predefined number of received error-free data packets;
   transmitting additional data packets from the testing device to the DUT if said number of data packets from the series of data packets received error-free by the DUT does not equal the predefined number of received error-free data packets;
   evaluating whether a total number of said number of data packets from the series of data packets and the additional data packets received error-free by the DUT equals the predefined number of received error-free data packets; and
   transmitting a confirmation data packet to the testing device in response to and only after reception by the DUT of said predefined number of received error-free data packets.

2. The method of claim 1, wherein:
   said series of data packets is transmitted at a first power level; and
   said additional data packets are transmitted at a second power level.

3. The method of claim 2, wherein said second power level is greater than said first power level.

4. The method of claim 2, wherein said additional data packets are transmitted at a power level expected to produce a zero packet error rate in the DUT.

5. The method of claim 2, wherein the DUT recognizes said additional data packets in response to the second power level.

6. The method of claim 1, wherein the packet error rate (PER) is calculated according to:

$$PER = ([Q/N] \times 100)$$

where N is the predefined number of received error-free data packets and Q is the number of data packets received error-free by the DUT from said additional data packets.

7. The method of claim 1, wherein the communication device is wireless.

8. The method of claim 1, wherein the transmitting steps occur wirelessly.

9. The method of claim 1, wherein:
   said number of data packets from the series of data packets equals said predefined number; and
   the additional data packets equal said predefined number.

10. A method of testing a communication device comprising:
    transmitting one or more data packets from a testing device to a device under test (DUT) in a test-ready sequence;
    determining whether the DUT is test-ready and transmitting a confirmation data packet from the DUT to the testing device in response thereto;
    transmitting a series of data packets from the testing device to the DUT;
    setting a predefined number of received error-free data packets;
    evaluating whether a number of data packets from the series of data packets received error-free by the DUT equals the predefined number of received error-free data packets;
    transmitting additional data packets from the testing device to the DUT if said number of data packets from the series of data packets received error-free by the DUT does not equal the predefined number of received error-free data packets;
    evaluating whether a total number of said number of data packets from the series of data packets and the additional data packets received error-free by the DUT equals the predefined number of received error-free data packets; and transmitting another confirmation data packet to the testing device in response to and only after reception by the DUT of said predefined number of received error-free data packets.

11. The method of claim 10, wherein the transmitting of one or more data packets from a testing device to a DUT in a test-ready sequence is performed as an initial test sequence of the DUT.

12. The method of claim 10, wherein:
said series of data packets is transmitted at a first power level; and
said additional data packets are transmitted at a second power level.

13. The method of claim 12, wherein said second power level is greater than said first power level.

14. The method of claim 12, wherein said additional data packets are transmitted at a power level expected to produce a zero packet error rate in the DUT.

15. The method of claim 12, wherein the DUT recognizes said additional data packets in response to the second power level.

16. The method of claim 10, wherein the packet error rate (PER) is calculated according to:

$$PER=([Q/N]\times 100)$$

where N is the predefined number of received error-free data packets and Q is the number of data packets received error-free by the DUT from said additional data packets.

17. The method of claim 10, wherein the communication device is wireless.

18. The method of claim 10, wherein the transmitting steps occur wirelessly.

19. The method of claim 10, wherein:
said number of data packets from the series of data packets equals said predefined number; and
the additional data packets equal said predefined number.

20. Test system for an electronic device comprising:
a controller coupled to a testing device via a first communications channel and operatively configured to command software functions of the testing device to control a device under test (DUT);
the testing device coupled to the DUT via a second communications channel and operatively configured to send, receive, and analyze electronic signals;
the DUT operatively configured to include a means of setting a predetermined number of error-free data packets representing a deterministic number of received error-free data, wherein the DUT transmits a confirmation data packet to the testing device in response to and only after reception by the DUT of the predefined number of received error-free data packets.

21. The system of claim 20, wherein the means of setting a pre-determined number of error-free data packets comprises an internal look-up table (LUT).

22. The system of claim 20, wherein the test system is wireless.

23. The system of claim 20, wherein the testing device is wirelessly connected to the DUT.

24. The system of claim 20, wherein the DUT is configured to receive data packets, decode the data packets and produce a return transmit signal for analysis by the testing device.

* * * * *